(12) United States Patent
Benthien et al.

(10) Patent No.: US 12,286,232 B2
(45) Date of Patent: Apr. 29, 2025

(54) RAIL MOUNTING ARRANGEMENT FOR A VEHICLE, SUCH AS AN AIRCRAFT, AND A VEHICLE EQUIPPED WITH SAID ARRANGEMENT

(71) Applicant: Airbus Operations GmbH, Hamburg (DE)

(72) Inventors: Hermann Benthien, Sottrum (DE); Andreas Poppe, Reeßum (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 52 days.

(21) Appl. No.: 18/329,658

(22) Filed: Jun. 6, 2023

(65) Prior Publication Data
US 2023/0406513 A1 Dec. 21, 2023

(30) Foreign Application Priority Data

Jun. 20, 2022 (EP) .................................... 22179897

(51) Int. Cl.
| | | |
|---|---|---|
| *B64D 11/06* | (2006.01) | |
| *B60N 2/015* | (2006.01) | |
| *B60N 2/08* | (2006.01) | |
| *B64C 1/18* | (2006.01) | |
| *F16B 1/02* | (2006.01) | |

(52) U.S. Cl.
CPC ...... *B64D 11/0696* (2013.01); *B60N 2/01516* (2013.01); *B60N 2/0875* (2013.01); *B64C 1/18* (2013.01); *B64D 11/06* (2013.01); *F16B 1/02* (2013.01)

(58) Field of Classification Search
CPC ....... B64D 11/0696; B64D 11/06; B64C 1/18; B64C 1/20; B60N 2/00; B60N 2/01516; B60N 2/0155; B60N 2/0875; F16B 1/02
See application file for complete search history.

(56) References Cited

U.S. PATENT DOCUMENTS

| | | |
|---|---|---|
| 2,655,981 A | 10/1953 | Whittingham et al. |
| 3,381,927 A | 5/1968 | Stephen |
| 8,998,323 B2 * | 4/2015 | Day ...................... B60N 2/427 297/344.1 |

(Continued)

FOREIGN PATENT DOCUMENTS

| | | |
|---|---|---|
| DE | 102009028533 A1 | 2/2011 |
| DE | 102009028534 A1 | 2/2011 |

(Continued)

OTHER PUBLICATIONS

European Search Report for corresponding European Patent Application No. 22179897 dated Nov. 30, 2022; priority document.

*Primary Examiner* — Tan Le
(74) *Attorney, Agent, or Firm* — Greer, Burns & Crain, Ltd.

(57) ABSTRACT

A mounting member configured to support a cabin component to be mounted to a mounting rail. The rail mounting arrangement comprises a disengagement locking mechanism that prevents a removal of the mounting member along a transversal direction of the mounting rail, while still allowing movement along the longitudinal direction. The rail mounting arrangement includes a securing mechanism that is configured to secure the mounting member at the desired location along the mounting rail.

20 Claims, 10 Drawing Sheets

(56) References Cited

U.S. PATENT DOCUMENTS

| | | |
|---|---|---|
| 9,789,965 B2 | 10/2017 | Benthien et al. |
| 11,524,788 B2 | 12/2022 | Roth et al. |
| 2019/0308736 A1 | 10/2019 | Gross |
| 2020/0031475 A1* | 1/2020 | Gross ................. B64D 11/0696 |

FOREIGN PATENT DOCUMENTS

| | | | | |
|---|---|---|---|---|
| DE | 102009028903 A1 | 3/2011 | | |
| DE | 102010053892 A1 | 6/2012 | | |
| DE | 102018122958 A1 | 3/2020 | | |
| EP | 3549863 A1 * | 10/2019 | ......... | B60N 2/01516 |
| EP | 3995380 A1 * | 5/2022 | ............... | B60N 2/01 |
| WO | WO-2017055364 A1 * | 4/2017 | ......... | B60N 2/01516 |

\* cited by examiner

RAIL MOUNTING ARRANGEMENT FOR A VEHICLE, SUCH AS AN AIRCRAFT, AND A VEHICLE EQUIPPED WITH SAID ARRANGEMENT

CROSS-REFERENCES TO RELATED APPLICATIONS

This application claims the benefit of the European patent application No. 22179897.8 filed on Jun. 20, 2022, the entire disclosures of which are incorporated herein by way of reference.

FIELD OF THE INVENTION

The invention relates to a rail mounting arrangement for a vehicle, preferably an aircraft. The invention further relates to a vehicle equipped with such an arrangement.

BACKGROUND OF THE INVENTION

DE 10 2010 053 892 A1 discloses a seat adjustment device for an aircraft that comprises a seat rail for connection to a floor. A worm is provided which can be actuated to adjust the seat connection in relation to the seat rail.

DE 10 2009 028 533 A1 discloses a guide rail which has a guiding device stretching in a guide direction and a cross-section device with a head section. A bar section forms a lateral engagement section stretching in a guide direction. The head section is formed in sections at a side with recesses for forming multiple laterally aligned latching sections.

DE 10 2009 028 903 A1 discloses a guide rail, which has a profiled guide unit with a head section. The guide unit extends in the guide direction, and has multiple interference sections formed at a distance from each other in the guide direction. A fastening unit is provided, which is attached on the module.

DE 10 2018 122 958 A1 discloses a floor fastening assembly for releasably fastening a leg of a frame to a vehicle floor. The assembly comprises a holding pin which can be fixed to the vehicle floor. The assembly further comprises a frame fastening element which is set up to be connected to the leg of the frame and which comprises a receiving space for receiving the holding pin. A clamping device is set up to be inserted into the receiving space of the frame fastening element in order to connect the frame fastening element to the holding pin in a form-fitting manner.

In vehicles, such as aircraft, buses, trains, ships, etc., seats or rows of seats are frequently attached to seat rails extending in the longitudinal direction of the vehicle. Operators of modern commercial aircraft are increasingly looking for more flexible design options for the interior of the passenger cabin. This includes rapid adjustment of the arrangement of seats or seat rows. For example, seat spacing between seats arranged one behind the other should be able to be changed as quickly and easily as possible, so that the division of the passenger cabin into a business class zone with more comfortable larger seat spacing and an economy class zone with smaller seat spacing can be changed as quickly, easily and flexibly as possible.

Another topic that is related to this flexibility is the issue of manufacturing tolerances. In addition, a flexible mounting scheme it is desired that manufacturing tolerances can be compensated in a simple and reliable fashion.

SUMMARY OF THE INVENTION

It is an object of the invention to improve rail mounting arrangements in vehicles, preferably in aircraft.

The invention provides a rail mounting arrangement for a vehicle, preferably for an aircraft, the arrangement comprising:
a mounting member that is configured to support a cabin component, such as a seat;
a mounting rail that extends in a longitudinal direction and that has a mounting profile portion that is configured for mounting the mounting member;
wherein the rail mounting arrangement includes a disengagement locking mechanism that is partially provided on the mounting member and on the mounting profile portion, respectively, wherein the disengagement locking mechanism includes a disengagement locking member that, when the disengagement locking member engages the mounting member and the mounting profile portion, prevents removal of the mounting member in a transversal direction of the mounting rail, and that, when the disengagement locking member is disengaged from the mounting member and the mounting rail, allows removal of the mounting member from the mounting rail,
wherein the rail mounting arrangement includes a securing mechanism that is partially provided on the mounting member and on the mounting profile portion, respectively, wherein the securing mechanism includes a first vertical locking portion that is arranged on the mounting member so as to face the mounting profile portion and a second vertical locking portion that is arranged on the mounting profile portion so as to face the mounting member,
wherein the first vertical locking portion and the second vertical locking portion are matched such that, when the securing mechanism is in a locked state, the first and second vertical locking portions engage each other in a form-fitting manner such that a movement of the mounting member relative to the mounting rail along the longitudinal direction is blocked.

Preferably, the mounting profile portion includes at least one outer lateral side portion that faces outward towards the mounting member. Preferably, the disengagement locking mechanism is partially provided on the at least one outer lateral side portion.

Preferably, the mounting member includes at least one inner lateral side portion that faces inward towards the mounting profile portion. Preferably, the disengagement locking mechanism is partially provided on the at least one inner lateral side portion.

Preferably, the disengagement locking mechanism includes at least one outer locking groove that is formed on the mounting profile portion and a corresponding number of inner locking grooves that are formed on the mounting member.

Preferably, the outer locking groove is arranged on the outer lateral side portion and the inner locking groove is arranged on the inner lateral side portion.

Preferably, the mounting profile portion includes a top side portion that faces upward towards the mounting member and extends in a horizontal direction, and the securing mechanism is partially provided on the top side portion.

Preferably, the mounting member includes a bottom side portion that faces downward towards the mounting profile portion and extends in a horizontal direction. Preferably, the securing mechanism is partially provided on the bottom side portion.

Preferably, the securing mechanism includes a plurality or securing recesses that are formed on the mounting rail and are recessed into the mounting profile portion. Preferably, the securing mechanism includes at least one securing protrusion that protrudes from the mounting member in vertical direction towards the mounting rail and, when the securing mechanism is in a secured state, into the mounting recesses.

Preferably, the securing recesses and the securing protrusions are both formed as matching toothed portions that, when the securing mechanism is in a secured state, mesh with each other.

Preferably, the securing mechanism comprises a securing member that is insertable between the mounting member and the mounting profile portion and comprises a toothed portion that, when the securing member is inserted and the securing mechanism is in a secured state, meshes with the toothed portion of the mounting profile portion.

Preferably, the securing mechanism includes a rotatable securing bolt that is rotatable about an axis that is parallel to the longitudinal direction and includes a toothed portion that, when the securing mechanism is in a secured state, meshes with the toothed portion of the mounting profile portion.

Preferably, the plurality of securing recesses is formed as a series of securing holes that are drilled in a vertical direction into the mounting profile portion. Preferably, the at least one securing protrusion is formed as a securing pin that extends in the vertical direction and, when the securing mechanism is in a secured state, is received a securing hole.

Preferably, the securing protrusion or the securing pin is movable along the vertical direction between an unsecured state and a secured state via a toolless moving mechanism.

Preferably, the mounting rail comprises a support portion made from a fiber reinforced plastic material or a metal material and the mounting profile portion is made from a metal material that is different from the metal material of the support portion. Preferably, the mounting profile portion is attached to the support portion, preferably by rivets that are aligned in a transversal direction of the mounting rail.

Preferably, the disengagement locking mechanism is configured such that, when the disengagement locking member is installed, the securing mechanism is forced into the secured state and movement of the mounting member is blocked.

The invention provides an aircraft or aircraft cabin including a floor portion and an arrangement according to any of the preceding claims, wherein a cabin component is removably attached to the floor portion via the arrangement.

With this rail mounting arrangement it is possible to reconfigure the cabin of a vehicle without using any tools. In a first step, the mounting member can be placed on the mounting rail and be prevented from coming loose by the disengagement locking mechanism. However, it is still possible to slide the mounting member along the mounting rail to define the end position of the mounting member. Subsequently, the mounting member can be secured to the mounting rail without a tool. In some embodiments, the disengagement lock and the securing mechanism are cooperative such that by inserting a single lock member, the mounting member is fixed in place on the mounting rail, whereas without the lock member the mounting member can still be slid along the mounting rail.

BRIEF DESCRIPTION OF THE DRAWINGS

Embodiments of the invention are described in more detail with reference to the accompanying schematic drawings that are listed below.

DETAILED DESCRIPTION OF THE PREFERRED EMBODIMENTS

Figure 1:
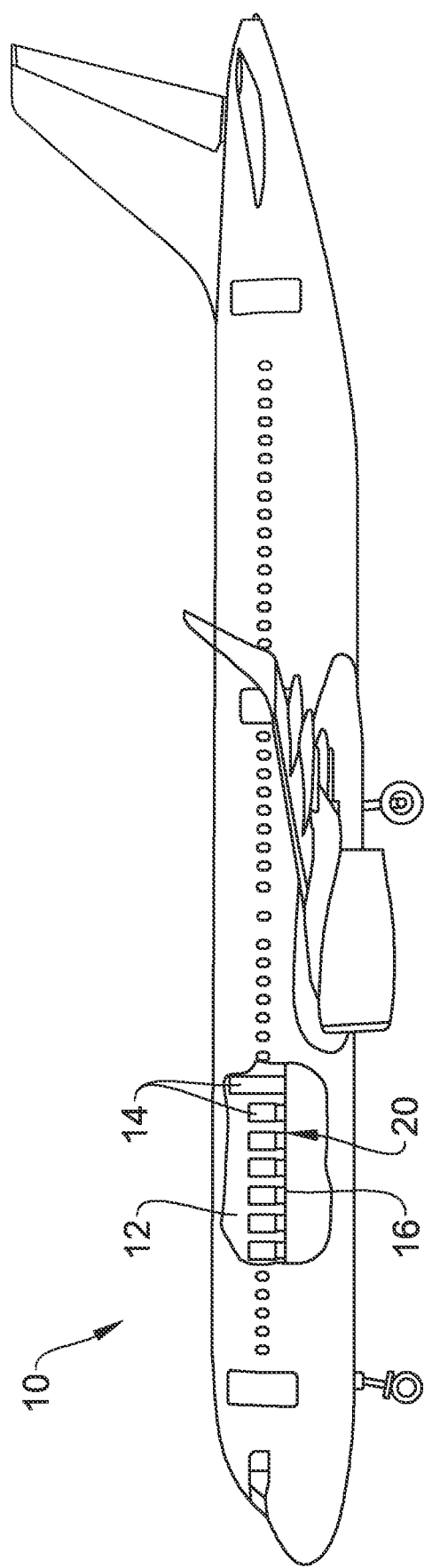
FIG. 1 depicts a side view of an embodiment of an aircraft.

Referring to FIG. 1, an aircraft 10 includes an aircraft cabin 12. In a manner known per se, the aircraft cabin 12 includes a plurality of cabin components 14 that are mounted to a floor portion 16. Examples for cabin components 14 include, but are not limited to, cabin monuments such as galleys and lavatories, passenger seats, and other floor-mounted components.

The cabin components 14 are mounted to the floor portion 16 by a rail mounting arrangement 20.

Figure 2:
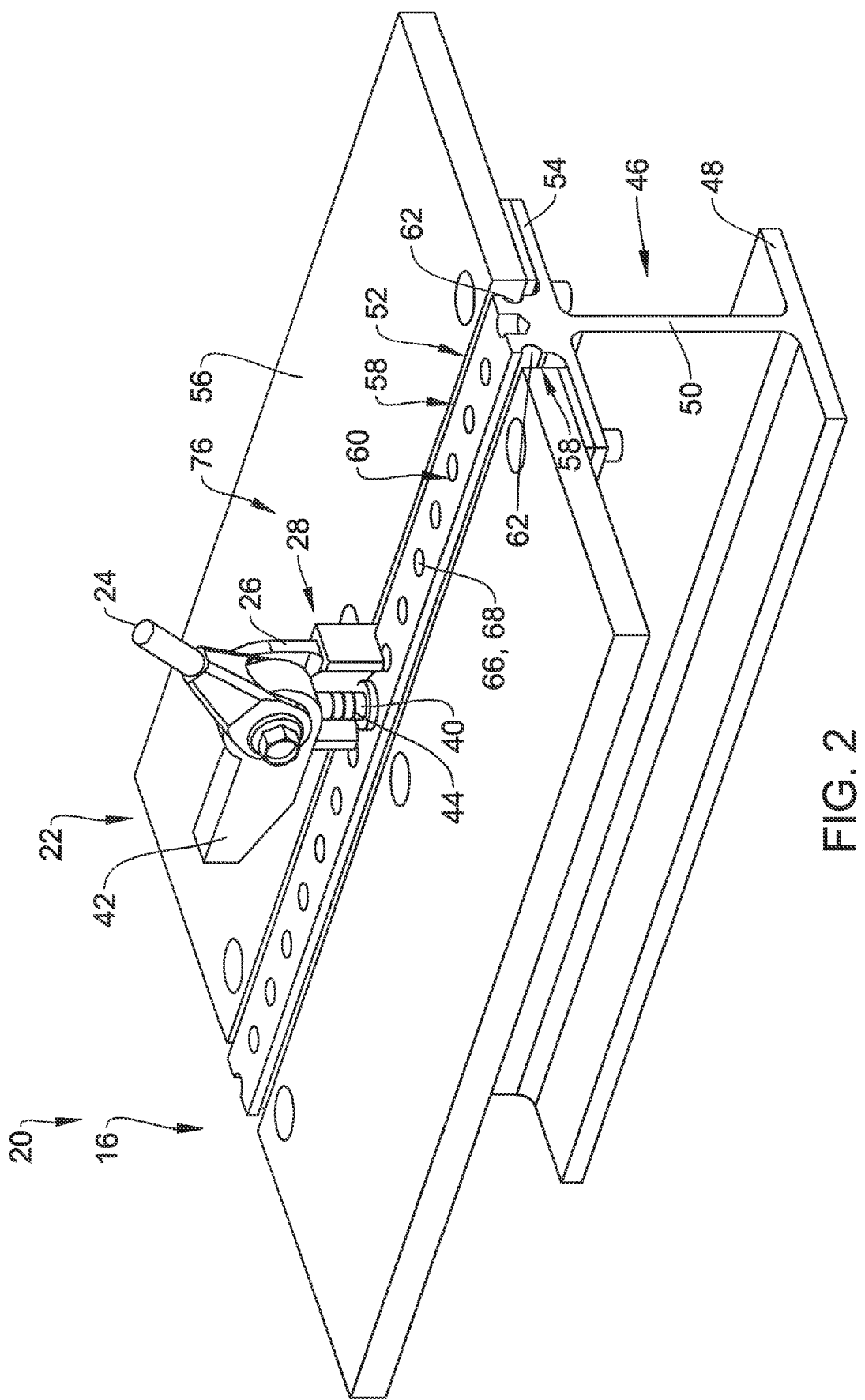
FIG. 2 depicts a perspective view first embodiment of a rail mounting arrangement.
Figure 3:
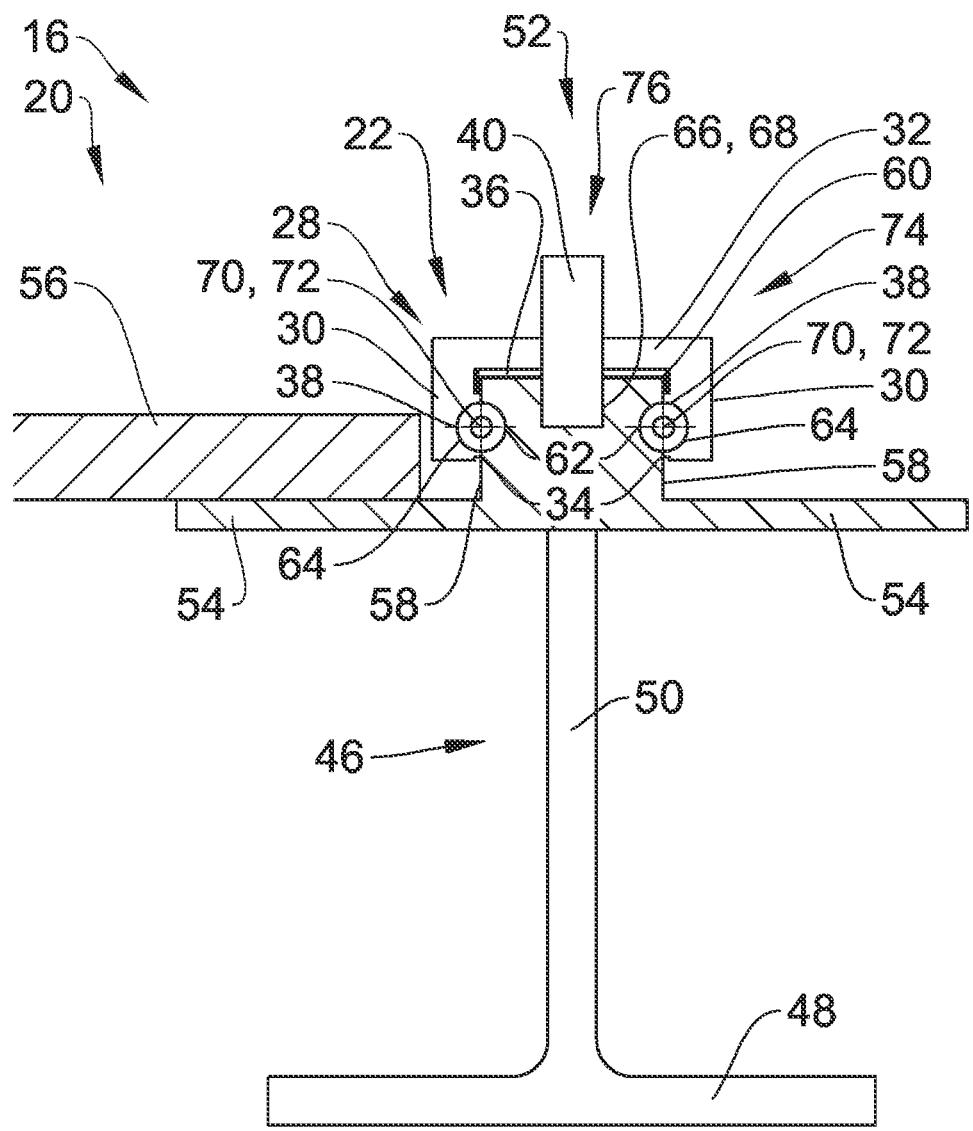
FIG. 3 depicts a cross-section of the first embodiment.

Referring to FIGS. 2 and 3, the rail mounting arrangement 20 is depicted in more detail. The rail mounting arrangement 20 comprises a mounting member 22. The mounting member 22 may include a mounting strut 24 that is connected to the cabin component 14 (not shown). The mounting strut 24 can pivot so as to form an angle between 0 degrees and 90 degrees relative to the horizontal floor portion 16.

The mounting member 22 preferably supports the mounting strut 24 on at least one flange portion 26.

The mounting member 22 further comprises a mounting section 28. The mounting section 28 preferably has C-shaped cross-section. The mounting section 28 includes a pair of lateral legs 30 that extend in a vertical direction. The mounting section 28 further comprises a base portion 32 that extends in the horizontal direction. The lateral legs 30 protrude from the base portion 32 downward.

Each lateral leg 30 preferably includes an inner lateral side portion 34 that is arranged to face towards a mounting channel 36 that is defined by the mounting section 28. The inner lateral side portion 34 may include an inner locking groove 38 that is open towards the mounting channel 36.

The mounting member 22 includes a securing pin 40. The securing pin 40 is arranged such that in a retracted position the securing pin 40 is flush or recessed with respect to the mounting channel 36. In other words, the mounting channel 36 is unobstructed when viewed along its longitudinal direction. The securing pin 40 can be moved into an extended position, in which the securing pin 40 protrudes from the base portion 32 into the mounting channel 36.

The mounting member 22 may include a securing lever 42. The securing lever 42 is rotatably supported by the mounting member 22. The securing lever 42 includes a cam portion that is configured so as to displace the securing pin 40 from the retracted position into the extended position.

The mounting member 22 may include an elastic member 44 that is arranged so as to press the securing pin 40 against the securing lever 42, specifically the cam portion.

The rail mounting arrangement 20 further comprises a mounting rail 46 that extends in a longitudinal direction. The mounting rail 46 has a support base 48 that extends in a horizontal direction. The support base 48 is typically in contact with a lower part of the floor portion 16 of the aircraft cabin 12.

The mounting rail 46 may further comprise a vertical support 50 that protrudes from the support base 48 upward.

The mounting rail 46 further includes a mounting profile portion 52. The mounting profile portion 52 may comprise a floorboard support 54. The floorboard support 54 supports a plurality of floorboards 56 that form the cabin floor of the aircraft cabin 12. The mounting profile portion 52 is configured for mounting the mounting member 22. Preferably, the mounting profile portion 52 is shaped so as to match the mounting section 28. The mounting profile portion 52 is preferably configured in a manner which allows the mounting profile portion 52 to be received inside the mounting channel 36.

The mounting profile portion 52 preferably includes a pair of outer lateral side portions 58. Each outer lateral side portion 58 preferably extends in a vertical direction and, when the mounting member 22 is installed, faces the mounting member 22, preferably the respective inner lateral side portions 34.

The mounting profile portion 52 may further include a top side portion 60. The top side portion 60 extends in a horizontal direction and along the longitudinal direction. The top side portion 60 is preferably arranged in between the outer lateral side portions 58. Together, the outer lateral side portions 58 and the top side portion 60 may be considered as outward facing surfaces.

Each outer lateral side portion 58 may include an outer locking groove 62. The outer locking groove 62 is arranged such that it faces the inner locking groove 38. The inner and outer locking grooves 38, 62 are in cooperation to form a disengagement locking channel 64. The disengagement locking channel 64 preferably has a circular or ellipsoidal cross-section.

The top side portion 60 may include a plurality of securing holes 66, which act as securing recesses 68. Each securing recess 68 is recessed from the surface of the top side portion 60 into the mounting profile section 52. The securing recesses 68 are shaped such that they can receive the securing pin 40 in a form-fitting manner.

The rail mounting arrangement 20 may further include a disengagement locking member 70. The disengagement locking member 70 preferably includes at least one disengagement locking pin 72. The disengagement locking member 70 is configured to be received in the disengagement locking channel 64. Preferably, the disengagement locking pin 72 has the same cross-section as the disengagement locking channel 64.

Subsequently, a mounting procedure for mounting the mounting member 22 to the mounting rail 46 is described in more detail.

Initially, the mounting member 22 and the mounting rail 46 are separate from each other. The mounting member 22 may be attached to a passenger seat, for example.

The mounting member 22 is arranged such that the mounting profile portion 52 engages the mounting member 22. Preferably, the mounting profile portion 52 is surrounded on three sides, when viewed in a cross-section, by the mounting section 28. Preferably, the mounting profile portion 52 is received in the mounting channel 36.

The disengagement locking member 70 is inserted into the disengagement locking channel 64. In this configuration, the mounting member 22 may still slide along the longitudinal direction of the mounting rail 46 supported by the mounting profile portion 52. However, when the disengagement locking member 70 is inserted into the disengagement locking channels 64, the mounting member 22 is blocked from being removed in the vertical transversal direction of the mounting rail 46. The disengagement locking member 70 and the inner and outer locking groove 38, 62 form a disengagement locking mechanism 74. Consequently, in the aforementioned configuration, the disengagement locking mechanism 74 prevents the mounting member 22 from being removed from the mounting profile portion 52 in the vertical direction, while still being moveable along the longitudinal direction of the mounting rail 46.

The mounting member 22 is slid along the mounting rail 46 until it reaches the desired location.

A user may operate the securing lever 42 so as to push the securing pin 40 from the retracted position into the extend position. The securing pin 40 is received in the securing recess 68 and prevents movement of the mounting member 22 along the longitudinal direction in a form-fitting manner. The securing pin 40 is an example of a securing protrusion. This securing protrusion and the securing recess 68 form a securing mechanism 76. In the configuration, when the securing pin 40 and the securing recess 68 engage, the securing mechanism 76 is in an engaged state. In the engaged state, the securing mechanism 76 prevents the mounting member 22 from being moved along the mounting rail 46 along the longitudinal direction.

In this configuration, the disengagement locking mechanism 74 and the securing mechanism 76 are separate mechanisms. It is therefore possible for the disengagement locking mechanism 74 to be in a locked state while the securing mechanism 76 in a disengaged state.

For sake of brevity, further embodiments of the invention are only described in so far as they differ from previously described embodiments.

Figure 4:
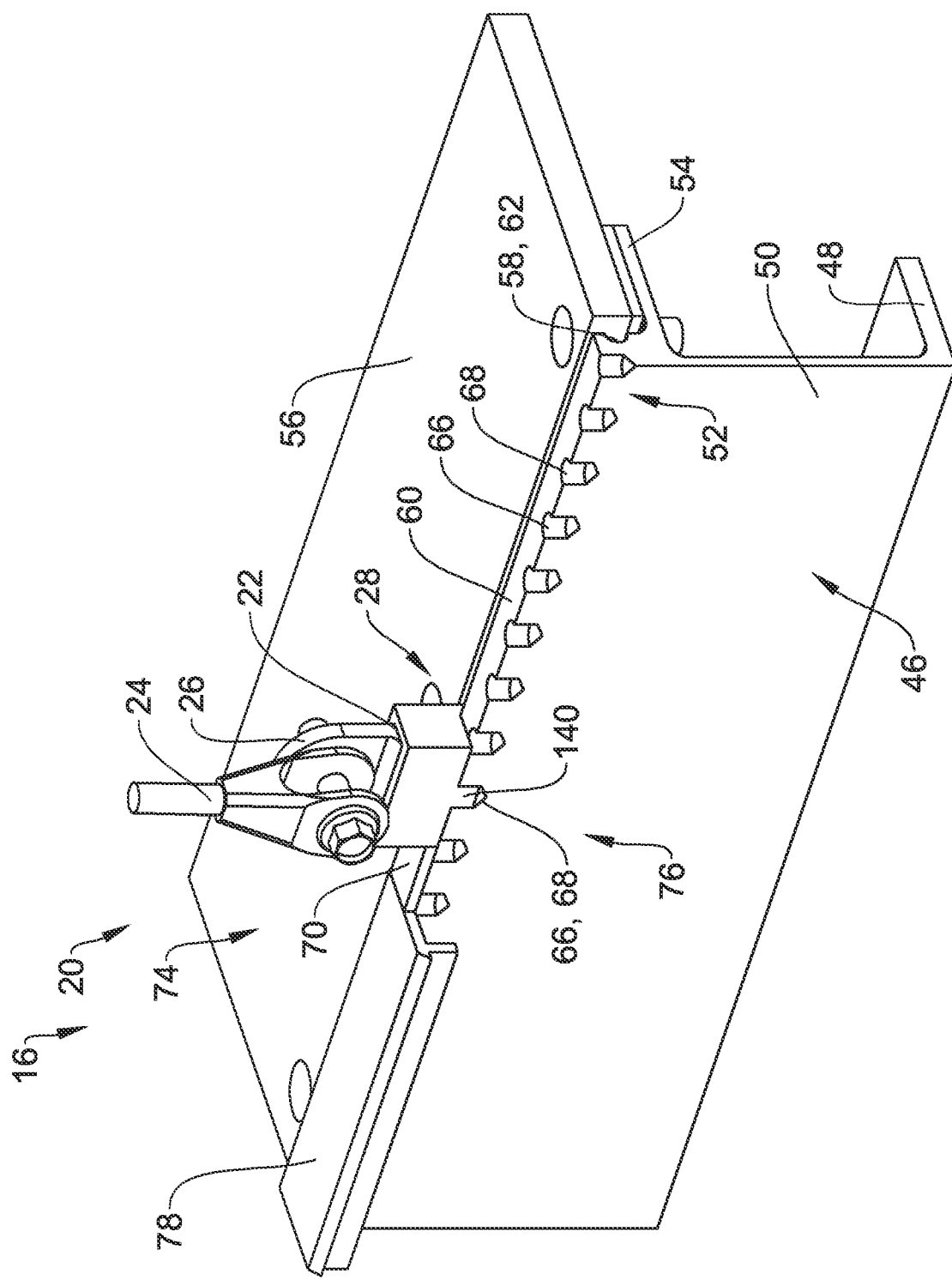
FIG. 4 depicts a partial longitudinal section of a second embodiment of a rail mounting arrangement.

Referring to FIG. 4, the mounting member 22 includes a fixed securing pin 140. The fixed securing pin 140 protrudes from the base portion 32 into the mounting channel 36.

Figure 5:
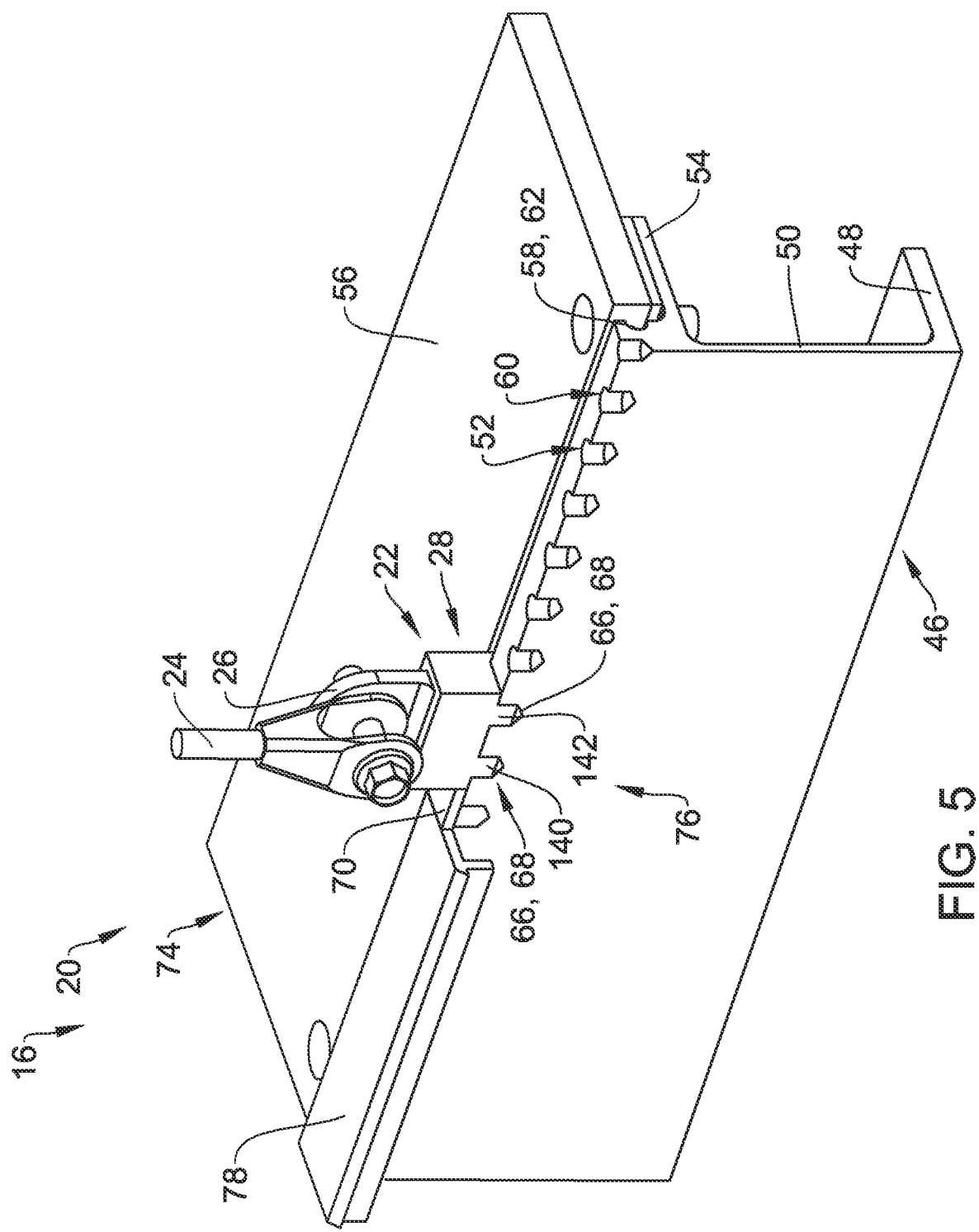
FIG. 5 depicts a partial longitudinal section of a variant of the second embodiment.

Referring to FIG. 5, the mounting member 22 is configured with the fixed securing pin 140 and a second fixed securing pin 142.

As depicted in both FIG. 4 and FIG. 5, the rail mounting arrangement 20 may include a rail cover 78, which is arranged to cover the unused sections of the mounting profile portion 52.

In the second embodiment and its variant according to FIG. 4 and FIG. 5, the fixed securing pin 140 and as the case may be the second fixed securing pin 142 together with the securing recesses 68 form a securing mechanism 176.

Subsequently, the mounting process for the mounting member 22 to the mounting rail 46 is described.

Similarly to the first embodiment, initially the mounting member 22 and the mounting rail 46 are separate from each other. However, due to the configuration of the securing mechanism 76, the mounting member 22 is positioned at the desired location, by inserting the fixed securing pin 140 and if applicable, the second fixed securing pin 142 into the securing recesses 68. In this configuration, the securing mechanism 76 is considered to be in an engaged state, since the mounting member 22 cannot be moved along the longitudinal direction of the mounting rail 46 due to the securing pins 140, 142 engaging the mounting profile portion 52 in a form-fitting manner.

The disengagement locking member 70 is inserted into the disengagement locking channel 64, whereby the mounting member 22 is prevented from being removed along a vertical direction from the mounting profile portion 52.

As a result, the mounting member 22 is fixed in location and the cabin component 14 that is supported by the mounting member 22 is attached to the floor portion 16.

Figure 6:
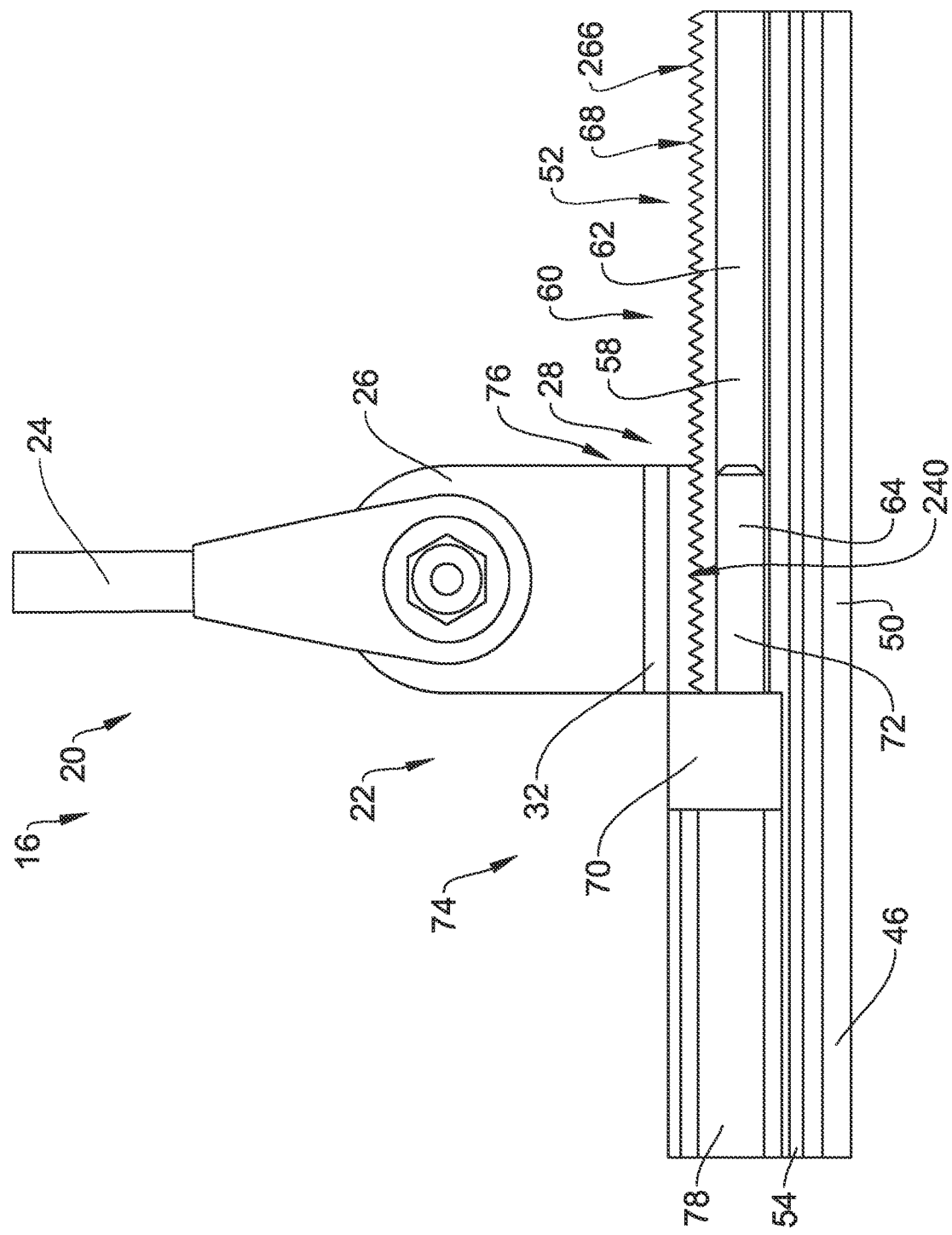
FIG. 6 depicts a partial longitudinal section of a third embodiment of a rail mounting arrangement.
Figure 7:
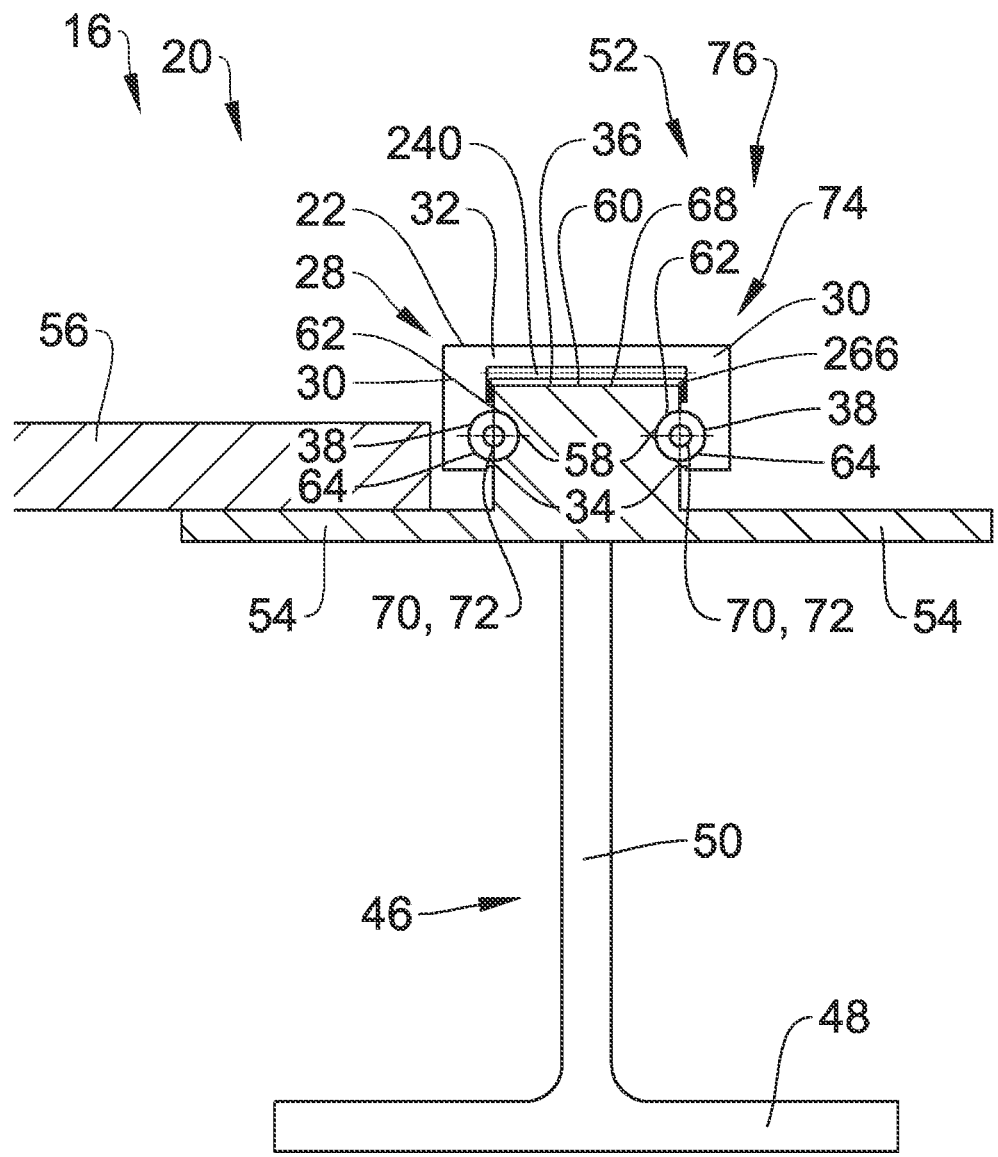
FIG. 7 depicts a cross-section of the third embodiment.

Referring to FIG. 6 and FIG. 7, the mounting member 22 comprises a toothed portion 240, wherein the protruding teeth form securing protrusions.

The top side portion 60 also includes a toothed portion 266, wherein the indentations act as securing recesses.

The installation (and removal) is identical to the second embodiment.

Figure 8:
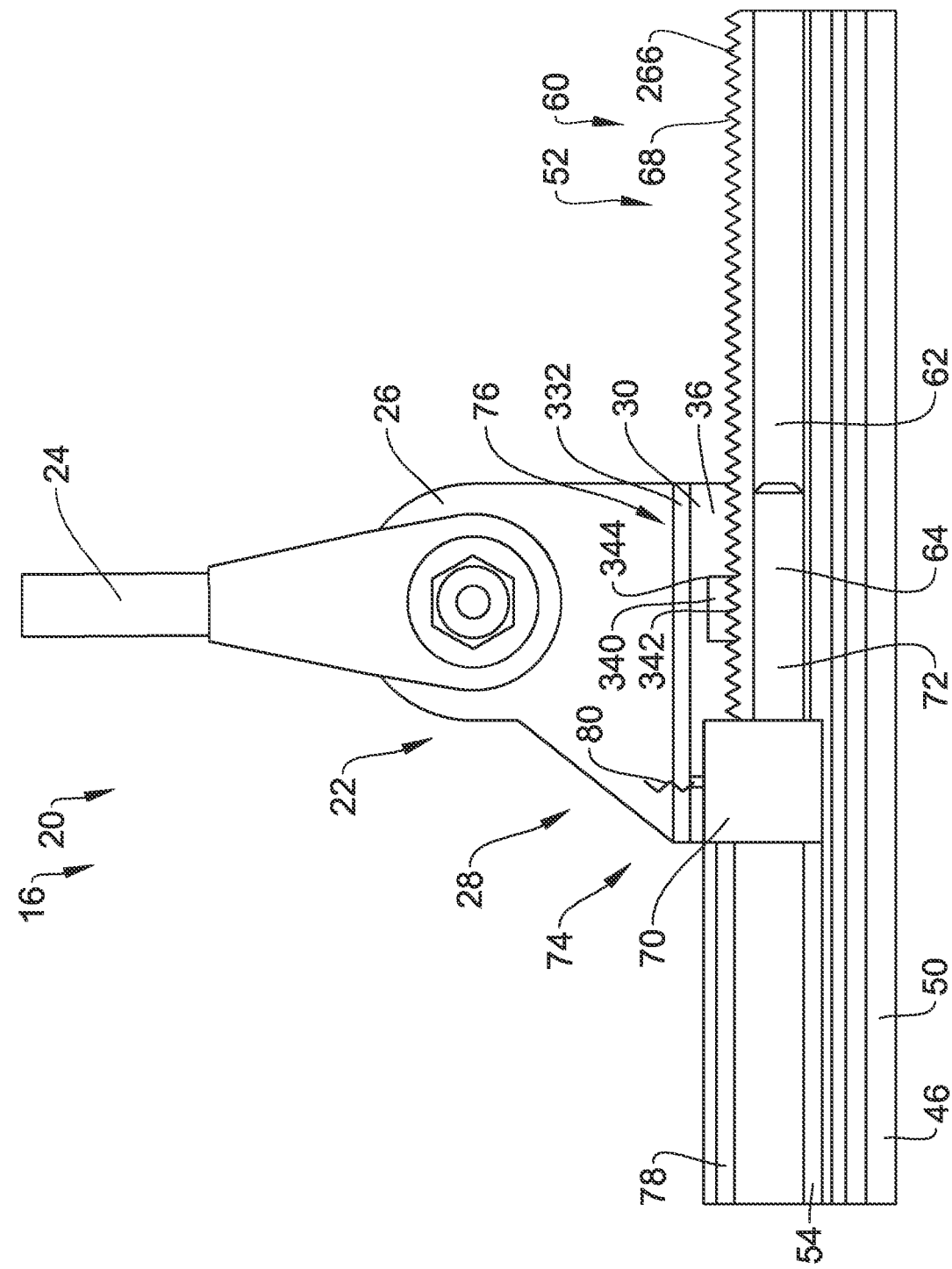
FIG. 8 depicts a partial longitudinal section of a fourth embodiment of a rail mounting arrangement.

Referring to FIG. 8, the mounting member 22 has a flat base portion 332, whereas the mounting profile portion 52, specifically the top side portion 60 includes the toothed portion 266.

The rail mounting arrangement 20 further includes a securing member 340 that has formed on it a tooth portion 342. The mounting member 22 includes an insertion opening 344 that is configured to receive the securing member 340.

Furthermore, the mounting member 22 may include a spring detent 80 that is arranged to engage the disengagement locking member 70, when it is inserted in the disengagement locking channel 64.

Similarly to the first embodiment, the mounting member 22 may engage the mounting profile portion 52 in a sliding manner. When the disengagement locking member 70 is inserted in the disengagement locking channel 64, the mounting member 22 can no longer be removed from the mounting rail 46 along the vertical direction. However, the mounting member 22 may still slide along the longitudinal direction. When the mounting member 22 is at the desired location, the securing member 342 is inserted into the insertion opening 344. The toothed portion 342 measures with the toothed portion 266 thereby preventing a movement of the mounting member 22 along the longitudinal direction.

It should be noted that in this embodiment the securing member 340 is part of the securing mechanism 76.

Figure 9:
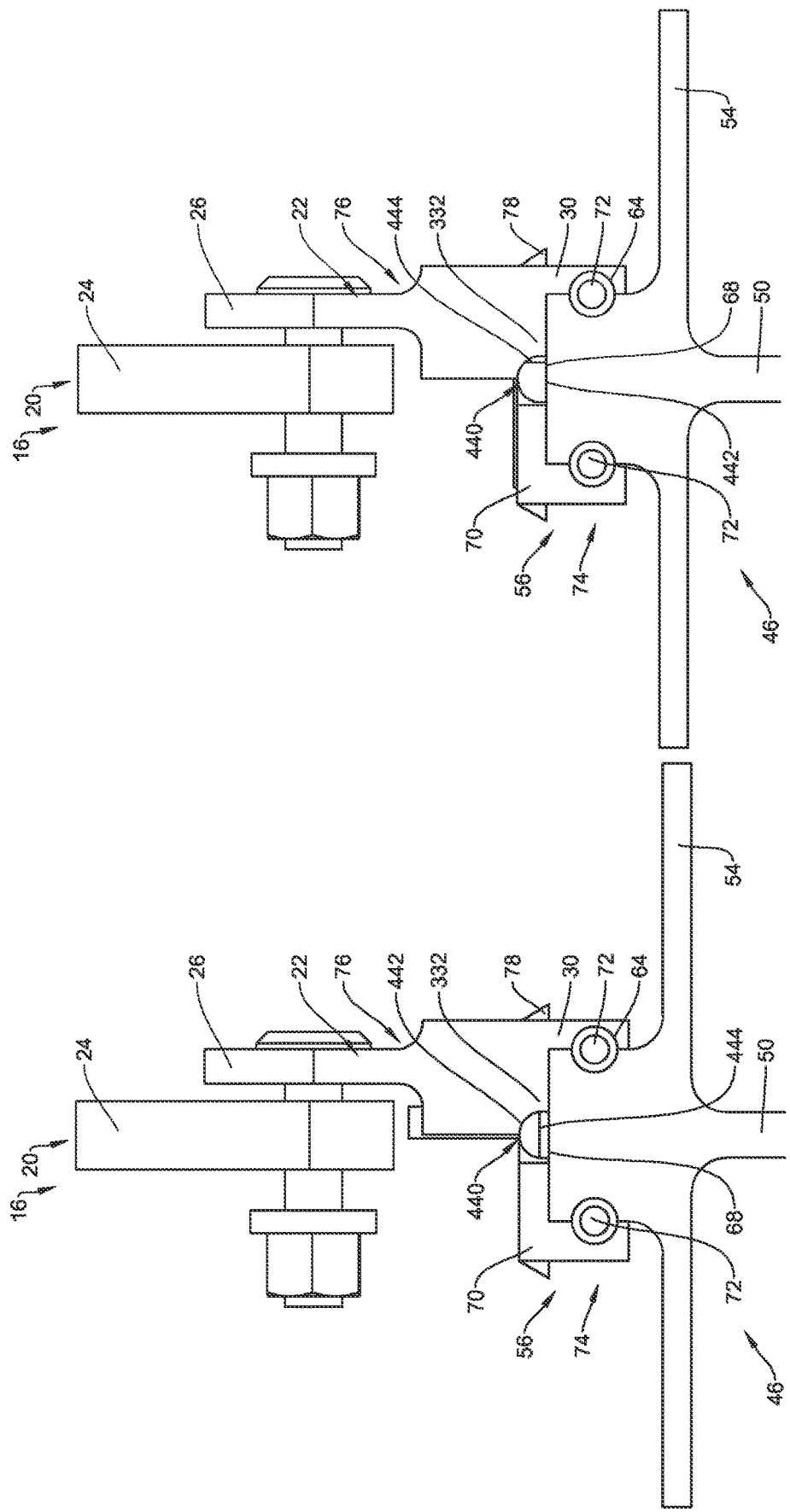
FIG. 9 depicts side-by side view of a fifth embodiment of a rail mounting arrangement.

Referring to FIG. 9, a fifth embodiment of the rail mounting arrangement 20 is illustrated wherein the left depicts the securing mechanism 76 in a disengaged state, whereas the right portion of the drawing depicts the securing mechanism 76 in an engaged state.

In this embodiment the mounting member 22 comprises a securing bolt 440. The securing bolt 440 is supported in a rotatable manner and includes a toothed portion 442. Furthermore, the securing bolt 440 includes a flat portion 444. The mounting process is similar to the first embodiment. Initially, the mounting member 22 may be attached to the mounting profile portion 52 in a sliding manner by inserting the disengagement locking member 70 into the disengagement locking channel 64. In this situation the securing bolt 440 is turned in such a way that the flat portion 444 faces the mounting profile portion 52. The mounting member 22 is thus able to slide along the longitudinal direction.

When the mounting member 22 is at the desired location, the securing bolt 440 is turned such that the tooth portion 442 meshes with the toothed portion 266. As a result, the mounting member 22 is now locked in place.

Figure 10:
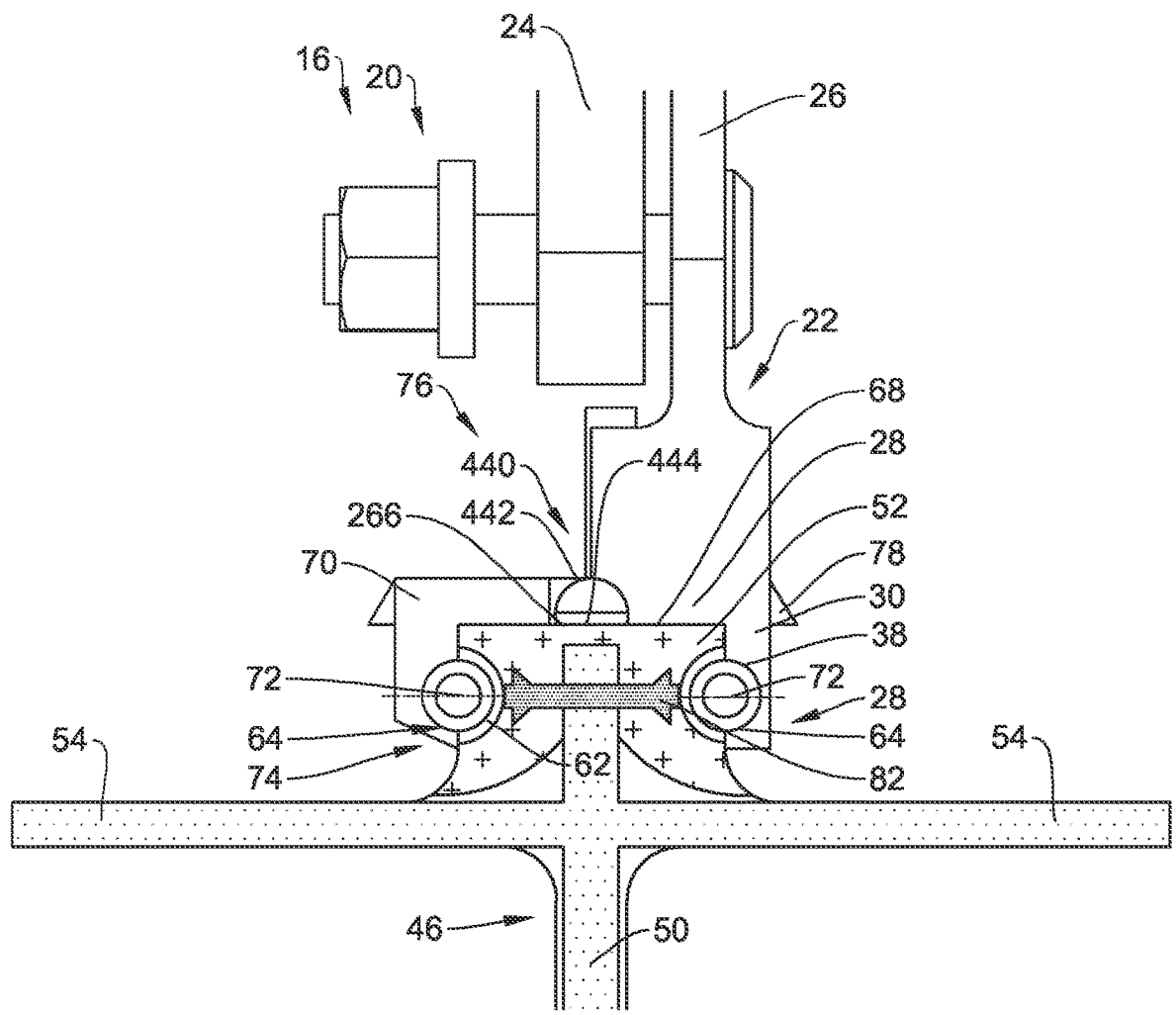
FIG. 10 depicts a partial cross-section of a sixth embodiment of a rail mounting arrangement.

Referring to FIG. 10, the rail mounting arrangement 20 is similar to the fifth embodiment; however, it should be noted that the configuration described herein is also applicable to all other embodiments.

In this embodiment, the mounting rail 46 is made from aluminum or fiber-reinforced plastic. The mounting profile portion 52, in contrast to the other embodiments, is made as a separate member out of a lightweight metallic material, preferably titanium. The mounting profile portion 52 otherwise comprises all the necessary features for implementing any of the previously described embodiments. The mounting profile portion 52 is riveted to the mounting rail 46, wherein the rivets 82 are horizontally aligned and engage with the outer lateral side portions 58.

In order to improve rail mounting arrangements in vehicles, preferably in aircraft, the invention proposes a mounting member 22, that is configured to support a cabin component 14 to be mounted to a mounting rail 46. The rail mounting arrangement 20 comprises a disengagement locking mechanism 74 that prevents a removal of the mounting member 22 along a transversal direction of the mounting rail 46, while still allowing movement along the longitudinal direction. The rail mounting arrangement 20 includes a securing mechanism 76 that is configured to secure the mounting member 22 at the desired location along the mounting rail 46.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS

10 aircraft
12 aircraft cabin
14 cabin component
16 floor portion
20 rail mounting arrangement
22 mounting member
24 mounting strut
26 flange portion
28 mounting section
30 lateral leg
32 base portion
34 inner lateral side portion
36 mounting channel
38 inner locking groove
40 securing pin
42 securing lever
44 elastic member
46 mounting rail
48 support base
50 vertical support
52 mounting profile portion
54 floorboard support
56 floorboard
58 outer lateral side portion
60 top side portion
62 outer locking groove 64 disengagement locking channel
66 securing hole
68 securing recess
70 disengagement locking member
72 disengagement locking pin
74 disengagement locking mechanism
76 securing mechanism
78 rail cover
80 spring detent
82 rivet
140 fixed securing pin
142 second fixed securing pin
240 toothed portion
266 toothed portion
332 base portion
340 securing member
342 toothed portion
344 insertion opening
440 securing bolt
442 toothed portion
444 flat portion

The invention claimed is:

1. A rail mounting arrangement for a vehicle, the arrangement comprising:
a mounting member configured to support a cabin component, an inner locking groove formed on the mounting member;
a mounting rail that extends in a longitudinal direction and that has a mounting profile portion that is configured for mounting the mounting member, an outer locking groove formed on the mounting profile portion, the outer locking groove cooperating with the inner locking groove to form a disengagement locking channel;
wherein the rail mounting arrangement includes a disengagement locking mechanism that is partially provided on the mounting member and on the mounting profile portion, respectively, wherein the disengagement locking mechanism includes a disengagement locking member comprising a disengagement locking pin that, when inserted within the disengagement locking channel, prevents removal of the mounting member in a transversal direction of the mounting rail, and that, when removed from the disengagement locking channel, allows removal of the mounting member from the mounting rail,
wherein the rail mounting arrangement includes a securing mechanism that is partially provided on the mounting member and on the mounting profile portion, respectively, wherein the securing mechanism includes a first vertical locking portion that is arranged on the mounting member so as to face the mounting profile portion and a second vertical locking portion that is arranged on the mounting profile portion so as to face the mounting member,
wherein the first vertical locking portion and the second vertical locking portion are matched such that, when the securing mechanism is in a locked state, the first and second vertical locking portions engage each other in a form-fitting manner such that a movement of the mounting member relative to the mounting rail along the longitudinal direction is blocked.

2. The arrangement according to claim 1, wherein the cabin component comprises a seat.

3. The arrangement according to claim 1, wherein the mounting profile portion includes at least one outer lateral side portion that faces outward towards the mounting member, and the disengagement locking mechanism is partially provided on the at least one outer lateral side portion.

4. The arrangement according to claim 1, wherein the mounting member includes at least one inner lateral side portion that faces inward towards the mounting profile portion, and the disengagement locking mechanism is partially provided on the at least one inner lateral side portion.

5. The arrangement according to claim 1,
wherein the outer locking groove is arranged on the at least one outer lateral side portion and the inner locking groove is arranged on the at least one inner lateral side portion.

6. The arrangement according to claim 5, wherein the mounting profile portion includes a top side portion that faces upward towards the mounting member and extends in a horizontal direction, and the securing mechanism is partially provided on the top side portion.

7. The arrangement according to claim 1, wherein the mounting member includes a bottom side portion that faces downward towards the mounting profile portion and extends in a horizontal direction, and the securing mechanism is partially provided on the bottom side portion.

8. The arrangement according to claim 1, wherein the securing mechanism includes a plurality or securing recesses that are formed on the mounting rail and are recessed into the mounting profile portion and includes at least one securing protrusion that protrudes from the mounting member in vertical direction towards the mounting rail and, when the securing mechanism is in a secured state, into the securing recesses.

9. The arrangement according to claim 8, wherein the securing recesses and the securing protrusions are both formed as matching toothed portions that, when the securing mechanism is in the secured state, mesh with each other.

10. The arrangement according to claim 8, wherein the securing mechanism comprises a securing member that is insertable between the mounting member and the mounting profile portion and comprises a toothed portion that, when the securing member is inserted and the securing mechanism is in the secured state, meshes with the toothed portion of the mounting profile portion.

11. The arrangement according to claim 8, wherein the securing mechanism includes a rotatable securing bolt that is rotatable about an axis that is parallel to the longitudinal direction and includes a toothed portion that, when the securing mechanism is in the secured state, meshes with the toothed portion of the mounting profile portion.

12. The arrangement according to claim 8, wherein the plurality of securing recesses is formed as a series of securing holes that are drilled in a vertical direction into the mounting profile portion, and the at least one securing protrusion is formed as a securing pin that extends in the vertical direction and, when the securing mechanism is in the secured state, is received a securing hole.

13. The arrangement according to claim 8, wherein the securing protrusion is movable along the vertical direction between an unsecured state and the secured state via a toolless moving mechanism.

14. The arrangement according to claim 1,
wherein the mounting rail comprises a support portion made from a fiber reinforced plastic material or a metal material and the mounting profile portion is made from a metal material that is different from the metal material of the support portion,
wherein the mounting profile portion is attached to the support portion.

15. The arrangement according to claim 14, wherein the mounting profile portion is attached to the support portion by rivets that are aligned in a transversal direction of the mounting rail.

16. The arrangement according to claim 8, wherein the disengagement locking mechanism is configured such that, when the disengagement locking member is installed, the securing mechanism is forced into the secured state and movement of the mounting member is blocked.

17. An aircraft including a floor portion and an arrangement according to claim 1, wherein a cabin component is removably attached to the floor portion via the arrangement.

18. An aircraft cabin including a floor portion and an arrangement according to claim 1, wherein a cabin component is removably attached to the floor portion via the arrangement.

19. The arrangement according to claim 1, wherein the disengagement locking channel has a length extending parallel to the longitudinal direction of the mounting rail.

20. The arrangement according to claim 1, wherein the disengagement locking pin is insertable into the disengagement locking channel in a direction parallel to the longitudinal direction of the mounting rail.

* * * * *